No. 805,845. PATENTED NOV. 28, 1905.
S. J. DUNKLEY.
MACHINE OR APPARATUS FOR AUTOMATICALLY PROCESSING OR COOKING AND COOLING CANNED FOOD.
APPLICATION FILED DEC. 1, 1904.
2 SHEETS—SHEET 1.
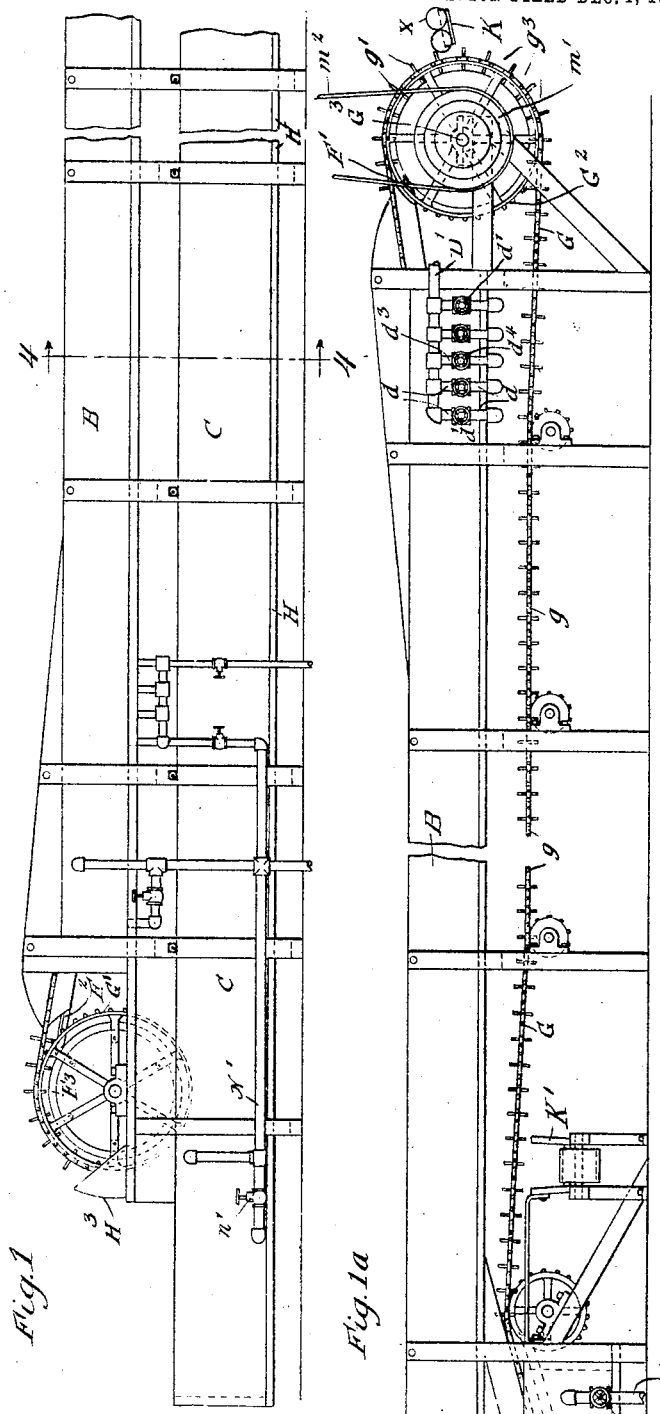
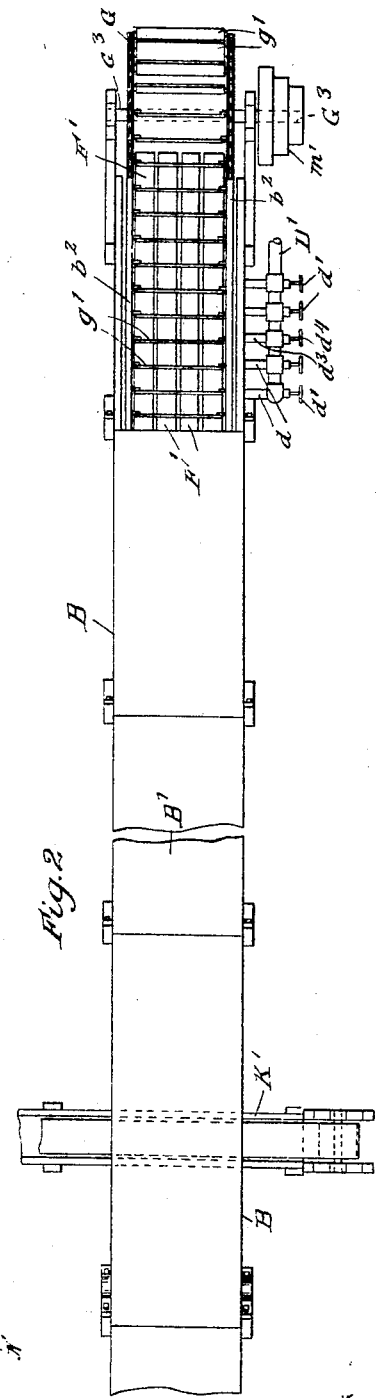
Witnesses:
Wm. Geiger
Inventor:
Samuel J. Dunkley
By Attorneys

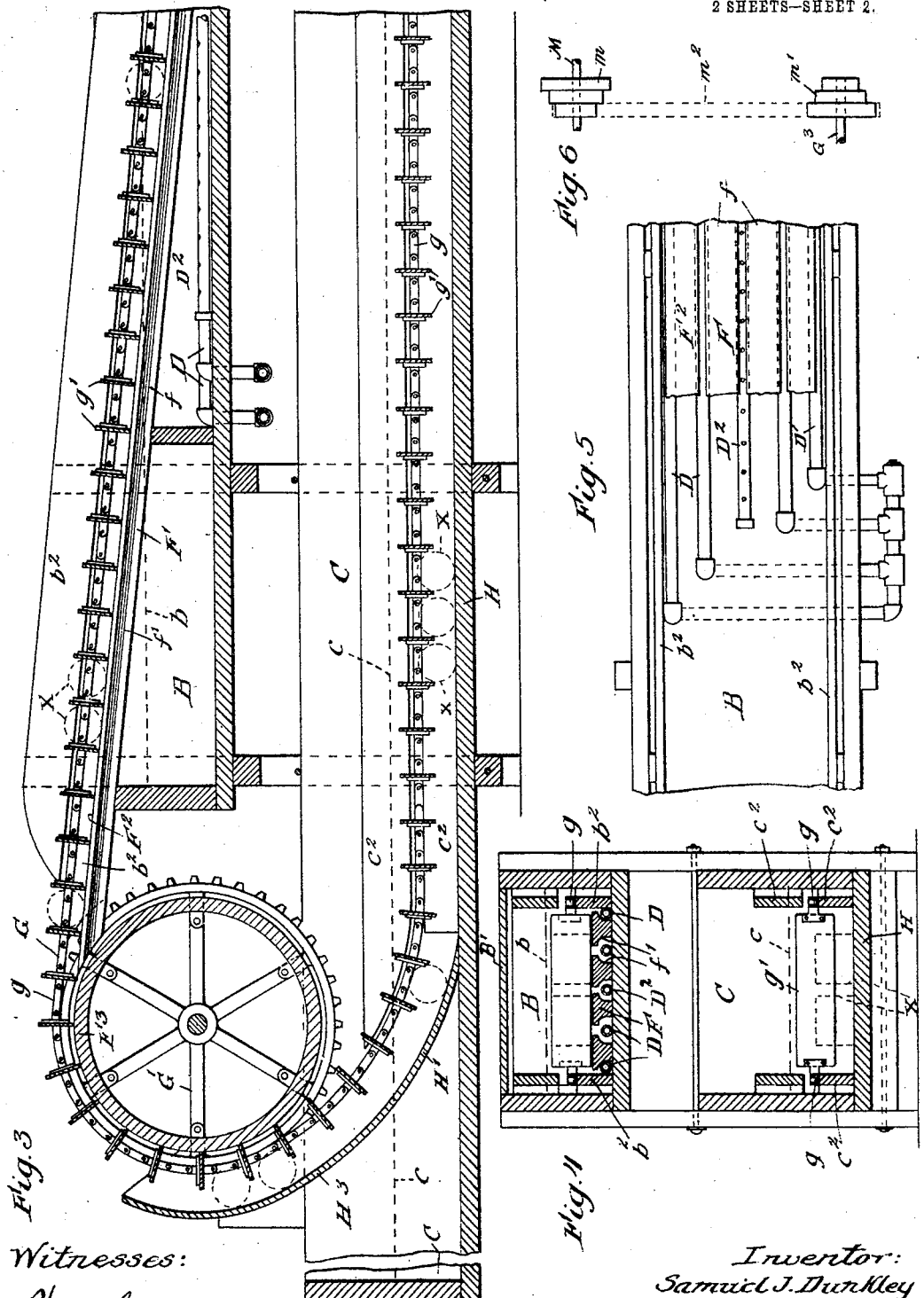

UNITED STATES PATENT OFFICE.

SAMUEL J. DUNKLEY, OF KALAMAZOO, MICHIGAN, ASSIGNOR TO DUNKLEY COMPANY, OF CHICAGO, ILLINOIS, A CORPORATION OF ILLINOIS.

MACHINE OR APPARATUS FOR AUTOMATICALLY PROCESSING OR COOKING AND COOLING CANNED FOOD.

No. 805,845.     Specification of Letters Patent.     Patented Nov. 28, 1905.

Application filed December 1, 1904. Serial No. 235,036.

*To all whom it may concern:*

Be it known that I, SAMUEL J. DUNKLEY, a citizen of the United States, residing in Kalamazoo, in the county of Kalamazoo and State of Michigan, have invented a new and useful Improvement in Machines or Apparatus for Automatically Processing or Cooking and Cooling Canned Food, of which the following is a specification.

My invention relates to machines or apparatus for processing or cooking and cooling canned goods.

The object of my invention is to provide an automatic machine or apparatus of a simple, efficient, and durable construction and of compact form, so as not to occupy undue space in the packing-house, by means of which cans or vessels may be processed or cooked and sterilized and again cooled without hand-labor or handling of the cans or vessels and by means of which the contents of the cans or vessels may be processed and cooked uniformly and to the precise degree or extent required for the particular kind or character of fruit, vegetables, or food product contained in the cans or vessels.

My invention consists in the means I employ for practically accomplishing this object or result—that is to say, it consists in a long horizontally-extending cooking-tank containing water or other liquid, through which the cans may be rolled and conveyed, a heater for the liquid in the tank, preferably consisting of a series of steam-pipes, a track or runway for the cans along which the cans may be rolled and having a downward incline at the entrance end of the tank and an upward incline at the exit end thereof, a long horizontally-extending cooling-tank beneath the heater-tank containing water or other cooling liquid and having a track or runway therein along which the cans may be rolled and having a downward incline at the entrance end of the cooling-tank and an upward incline at the exit end thereof, an endless conveyer having a series of can-pusher arms by which the cans are separated from each other and pushed or rolled continuously along first through the cooking-tank and then through the cooling-tank and tracks or guides for the endless conveyer extending parallel to the can runways or tracks into and out of the cooking-tank and into and out of the cooling-tank, and chutes or runways by which the cans are automatically delivered to the conveyer and cooking-runway and automatically discharged from the conveyer and automatically discharged from the conveyer and cooling-runway, and means for varying or regulating the speed of the conveyer to give the required different periods of time in the heating or cooking liquid for cooking or sterilizing different kinds of food products, some of which, as is well known, require a greater and some a less length of time.

My invention also consists in the novel construction of parts and devices and in the novel combinations of parts and devices herein shown and described.

In the accompanying drawings, forming a part of this specification, Figures 1 and 1ª taken together are a side elevation of a machine or apparatus embodying my invention. Fig. 2 is a plan view of the portion of the machine shown in Fig. 1ª. Fig. 3 is a partial central vertical longitudinal section. Fig. 4 is a cross-section on line 4 4 of Fig. 1. Fig. 5 is an enlarged detail plan view of a portion of the machine, and Fig. 6 is a detail view showing the driving mechanism for the conveyer.

In the drawings, A represents the frame of the machine.

B is a long horizontal cooking-tank containing a cooking liquid *b*, preferably water.

C is a cooling-tank containing a cooling liquid *c*, preferably water, and located under the cooking-tank and extending for a portion of the length of the cooking-tank, the latter ordinarily being from fifty to one hundred feet in length, and the cooling-tank extending, preferably, for about half the length of the cooking-tank. As the cooking-tank necessarily requires to be of considerable length to give time for the contents of the can to be properly cooked and sterilized as the cans or vessels are conveyed and rolled through the hot liquid, the combination and arrangement of the long cooling-tank under the long cooking-tank materially reduces the space required in the packing-house for the apparatus and also materially reduces the cost of manufacturing the machine.

The cooking liquid *b* in the tank B is heated, preferably, to about the boiling-point by a suitable heater, the same preferably consisting of a series of closed steam-pipes D in the bottom of the tank and extending longitudinally thereof and connecting by branch pipes $d$ with the steam-supply pipe D'. Each of the branch pipes $d$ is furnished with a valve $d'$, so that the temperature of the cooking liquid may be properly regulated and maintained uniform. An open or perforated steam-pipe $D^2$ is also preferably employed in the cooking-tank B, so that live steam may be delivered into the liquid of the tank when required. This provision is of special use and convenience in quickly bringing the temperature of the liquid up to the required point in the morning or in starting the apparatus, and it also may be used for quickly restoring the temperature to the required degree during operation if for any cause the temperature may have fallen. The perforated steam-pipe $D^2$ connects with the steam-supply pipe D' through a branch pipe $d^3$, having a valve $d^4$. The open or perforated steam-pipe $D^2$ is preferably located in the middle of the tank B, so that it will come between the two rows of cans being rolled and conveyed through the tank.

The tank B is further provided with a can-runway F, preferably comprising a plurality of longitudinal slats $f$, having curved sides $f''$ to accommodate the longitudinally-extending steam-pipes D and $D^2$. The slats of the runway are thus interposed between the heater-pipes and the cans rolling along the runway. The can-runway F has a downward incline F' at the entrance end of the tank and an upward incline $F^2$ at the exit end thereof.

To cause the cans to be conveyed through the cooking liquid in the tank at a uniform speed, so that each and every can will be subjected to the same identical and uniform heating and cooking action, and so that at the same time each can will be continuously and uniformly turned or rotated on its own axis or rolled along the runway to enable the interior or central and peripheral portions of the contents of the can to be uniformly cooked and processed, so that the cans' contents will be properly cooked at the center without overcooking at the outer parts, I combine with the other parts an endless conveyer G, preferably consisting of a pair of chains $g$ $g$, furnished with can-pusher arms or blades $g'$, which preferably extend between and connect the parallel chains $g$ $g$, the pusher-arms engaging the cans at the extremity of their horizontal diameter, and thus causing them to continuously roll along the can-runway F into, through, and out of the cooking liquid $b$ in the cooking-tank B. The endless conveyer G travels on two pairs of pulleys or sprocket-wheels G' $G^2$, located at each end of the cooking-tank B and just outside the same. To properly support the chains $g$ of the conveyer, the cooking-tank is provided with conveyer guides or tracks $b^2$. The pulley or sprocket-wheel G' of the endless conveyer at the exit end of the cooking-tank B is mounted between the cooking and cooling tanks, and the can-runway F joins a curved drum $F^3$, extending around the axis of the pulley or sprocket-wheels G'.

The cooling-tank C has a can-runway H, extending through the same, furnished with a downward incline H' at the entrance end of the tank and with an upward incline $H^2$ at the exit end thereof, and this can-runway also has a curved extension $H^3$, extending partially around the pulley or sprocket-wheel G' to properly guide and support the cans as they pass around this wheel from the cooking-tank to the cooling-tank below. To properly guide and support the conveyer in the cooling-tank C, the cooling-tank is furnished with guides or track $c^2$ for the chains $g$ of the conveyer.

K is the feed-chute or runway by which the cans are delivered automatically into the can pockets or receptacles $g^3$ of the conveyer G, these can pockets or receptacles being formed by the series of can-pusher arms $g'$ and being the open spaces between said arms. The can pockets or receptacles $g^3$ in the conveyer are open—that is, have neither top nor bottom—so that the cans may rest and roll on the cooking-runway F as the cans are conveyed through the cooking-tank by upper run of the endless conveyer, and so that the cans may also rest and roll on the cooling-runway H as the cans are conveyed through the cooling-tank by the lower run of the endless conveyer, and so that the cans may be automatically discharged or delivered from the conveyer to the discharge chute or runway K'.

Motion is communicated at the required speed to properly cook and sterilize the particular kind of food product contained in the cans being treated, and is imparted to the conveyer G from the driving-shaft M to the shaft $G^3$ of the pulley or sprocket-wheels $G^2$ by means of a graduated pulley $m$ on the driving-shaft M and graduated pulley $m'$ on the shaft $G^3$ and belt $m^2$ or other suitable connecting gearing.

In operation the cans or vessels $x$ containing the food to be cooked and sterilized are conveyed and rolled along the runway F through the cooking-tank B, and then along the runway H through the cooling-tank, the constant turning and rolling movement of the cans insuring the contents of the cans to be uniformly cooked and sterilized to the center thereof, and also in the cooling operation cause the whole contents of the cans to be properly cooled. A constant supply of cold water is delivered to the cooling-tank through the water-supply pipe N, having a valve $n$, while the warmer water in the cooling-tank is drawn off through the discharge-pipe N', which is also furnished with a valve n'. The stored or latent heat in the large mass of hot or boiling water b in the cooking-tank B prevents the cold cans as they pass into the tank from materially chilling the water or reducing its temperature, and the heat absorbed from the cooking liquid b by the cans and their contents is continually supplied by the heater D, so that the cans and their contents are subjected to a uniform treatment and cooked and sterilized properly and uniformly with certainty and reliability and without danger of loss of any of the cans from defective sterilization, while at the same time the goods in the cans are not injured by undue or over cooking. At the same time by my apparatus the work is performed very rapidly and cheaply and without hand-labor.

The tank B is preferably furnished with a removable cover B', which, like the tank B, is preferably of wood, and serves to retain the heat in the cooking-tank.

I hereby disclaim the apparatus shown and described in the J. Baker patent, No. 369,424, dated September 6, 1887, in which the cans are placed on trays and conveyed through a steam-tank by means of an endless conveyer, upon which the can-supporting trays rest; and I also disclaim the apparatus shown and described in the Merrill and Lovell patent, No. 498,358, dated May 30, 1893, in which the apparatus comprises a steam-box having a rotary can-feeding valve or pocketed roller in its top for feeding the cans one by one into the steam-chest and a similar can-discharging valve or pocketed roller at its bottom for discharging the cans from the steam-chest, in connection with a convoluted inclined runway extending in a plurality of folds or laps from the bottom to the top of the steam-chest, and an endless conveyer extending in a plurality of runs along the convoluted runway.

I claim—

1. In a machine for processing or cooking and cooling cans or vessels, the combination of a cooking-tank with a cooling-tank arranged beneath the cooking-tank, and an endless conveyer the upper portion of which being situated within the cooking-tank and the lower portion within the cooling-tank, said tanks and conveyer being so arranged that the cans are transferred directly by said conveyer from the cooking-tank to the cooling-tank, substantially as specified.

2. In a can cooking and cooling machine, the combination with a cooking-tank, of a cooling-tank arranged beneath the cooking-tank, a can-runway in the cooking-tank having a downward incline at the entrance end thereof and an upward incline at the exit end thereof, a can-runway in the cooling-tank having a downward incline at the entrance end thereof and an upward incline at the exit end thereof, and an endless conveyer having its upper run or portion in said cooking-tank and its lower run or portion in said cooling-tank, and furnished with pusher-arms forming open pockets or receptacles for the cans or vessels between the pusher-arms for pushing and rolling the cans along said runways and through the cooking-tank and the cooling-tank, said endless conveyer transferring the cans directly from the cooking-tank to the cooling-tank, substantially as specified.

3. In a can cooking and cooling machine, the combination with a cooking-tank, of a cooling-tank arranged beneath the cooking-tank, a can-runway in the cooking-tank having a downward incline at the entrance end thereof and an upward incline at the exit end thereof, a can-runway in the cooling-tank having a downward incline at the entrance end thereof and an upward incline at the exit end thereof, and an endless conveyer having its upper run or portion in said cooking-tank and its lower run or portion in said cooling-tank, and furnished with pusher-arms forming open pockets or receptacles for the cans or vessels between the pusher-arms for pushing and rolling the cans along said runways and through the cooking-tank and the cooling-tank, said endless conveyer transferring the cans directly from the cooking-tank to the cooling-tank, and a feed chute or runway for automatically delivering the cans or vessels to the conveyer, substantially as specified.

4. In a can cooking and cooling machine, the combination with a cooking-tank, of a cooling-tank arranged beneath the cooking-tank, a can-runway in the cooking-tank having a downward incline at the entrance end thereof and an upward incline at the exit end thereof, a can-runway in the cooling-tank having a downward incline at the entrance end thereof and an upward incline at the exit end thereof, and an endless conveyer having its upper run or portion in said cooking-tank and its lower run or portion in said cooling-tank, and furnished with pusher-arms forming open pockets or receptacles for the cans or vessels between the pusher-arms for pushing and rolling the cans along said runways and through the cooking-tank and the cooling-tank, said endless conveyer transferring the cans directly from the cooking-tank to the cooling-tank, and a feed chute or runway for automatically delivering the cans or vessels to the conveyer, and a discharge chute or runway to receive the cans or vessels from said conveyer, substantially as specified.

5. In a can cooking and cooling machine, the combination with a cooking-tank, of a cooling-tank arranged beneath the cooking-tank, a can-runway in the cooking-tank having a downward incline at the entrance end thereof and an upward incline at the exit end thereof, a can-runway in the cooling-tank having a downward incline at the entrance end thereof and an upward incline at the exit end thereof, and an endless conveyer having its upper run or portion in said cooking-tank and its lower run or portion in said cooling-tank, and furnished with pusher-arms forming open pockets or receptacles for the cans or vessels between the pusher-arms for pushing and rolling the cans along said runways and through the cooking-tank and the cooling-tank, said endless conveyer transferring the cans directly from the cooking-tank to the cooling-tank, and guides or tracks for said conveyer.

6. In a can cooking and cooling machine, the combination with a cooking-tank, of a can-runway extending into, through and out of said tank, a cooling-tank arranged beneath said cooking-tank, a can-runway extending into, through and out of said cooling-tank, an endless conveyer having its upper run or portion within said cooking-tank, and its lower run or portion within said cooling-tank, and furnished with pusher-arms for rolling the cans along said runways in said tanks, pulleys for said endless conveyer, said endless conveyer being arranged and combined with the tanks to transfer the cans directly from the cooking-tank to the cooling-tank, substantially as specified.

7. In a can cooking and cooling machine, the combination with a cooking-tank, of a can-runway extending into, through and out of said tank, a cooling-tank arranged beneath said cooking-tank, a can-runway extending into, through and out of said cooling-tank, an endless conveyer having its upper run or portion within said cooking-tank, and its lower run or portion within said cooling-tank, and furnished with pusher-arms for rolling the cans along said runways in said tanks, pulleys for said endless conveyer, said endless conveyer being arranged and combined with the tanks to transfer the cans directly from the cooking-tank to the cooling-tank, and guides for said conveyer, substantially as specified.

8. In a can cooking and cooling machine, the combination with a cooking-tank, of a can-runway extending into, through and out of said tank, a cooling-tank arranged beneath said cooking-tank, a can-runway extending into, through and out of said cooling-tank, an endless conveyer having its upper run or portion within said cooking-tank, and its lower run or portion within said cooling-tank, and furnished with pusher-arms for rolling the cans along said runways in said tanks, pulleys for said endless conveyer, said endless conveyer being arranged and combined with the tanks to transfer the cans directly from the cooking-tank to the cooling-tank, and a can-feed chute or runway, substantially as specified.

9. In a can cooking and cooling machine, the combination with a cooking-tank, of a can-runway extending into, through and out of said tank, a cooling-tank arranged beneath said cooking-tank, a can-runway extending into, through and out of said cooling-tank, an endless conveyer having its upper run or portion within said cooking-tank, and its lower run or portion within said cooling-tank, and furnished with pusher-arms for rolling the cans along said runways in said tanks, pulleys for said endless conveyer, said endless conveyer being arranged and combined with the tanks to transfer the cans directly from the cooking-tank to the cooling-tank, and a can-discharge chute or runway, substantially as specified.

10. In a can cooking and cooling machine, the combination with a cooking-tank, of a can-runway extending into, through and out of said tank, a cooling-tank arranged beneath said cooking-tank, a can-runway extending into, through and out of said cooling-tank, an endless conveyer having its upper run or portion within said cooking-tank, and its lower run or portion within said cooling-tank, and furnished with pusher-arms for rolling the cans along said runways in said tanks, pulleys for said endless conveyer, said endless conveyer being arranged and combined with the tanks to transfer the cans directly from the cooking-tank to the cooling-tank, and a series of steam-heater pipes in said cooking-tank for heating the water or liquid therein, substantially as specified.

11. In a can cooking and cooling machine, the combination with a cooking-tank, of a can-runway extending into, through and out of said tank, a cooling-tank arranged beneath said cooking-tank, a can-runway extending into, through and out of said cooling-tank, an endless conveyer having its upper run or portion within said cooking-tank, and its lower run or portion within said cooling-tank, and furnished with pusher-arms for rolling the cans along said runways in said tanks, pulleys for said endless conveyer, said endless conveyer being arranged and combined with the tanks to transfer the cans directly from the cooking-tank to the cooling-tank, and a series of closed steam-pipes and a series of open or perforated steam-pipes in said cooking-tank for heating the water or liquid therein, substantially as specified.

12. In a can cooking and cooling machine, the combination with a cooking-tank, of a can-runway extending into, through and out of said tank, a cooling-tank arranged beneath said cooking-tank, a can-runway extending into, through and out of said cooling-tank, an endless conveyer having its upper run or portion within said cooking-tank, and its lower run or portion within said cooling-tank, and furnished with pusher-arms for rolling the cans along said runways in said tanks, pulleys for said endless conveyer, said endless conveyer being arranged and combined with the tanks to transfer the cans directly from the cooking-tank to the cooling-tank, and means for regulating the speed of said conveyer to adjust the apparatus for cooking different materials, substantially as specified.

SAMUEL J. DUNKLEY.

Witnesses:
    EDMUND ADCOCK,
    H. M. MUNDAY